United States Patent
Voyer (10) Patent No.: US 6,680,699 B2
(45) Date of Patent: Jan. 20, 2004

(54) SIGNAL RECEPTION METHOD AND DEVICE

(75) Inventor: Nicolas Voyer, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/127,761

(22) Filed: Apr. 23, 2002

(65) Prior Publication Data

US 2003/0022649 A1 Jan. 30, 2003

(30) Foreign Application Priority Data

May 3, 2001 (FR) .............................. 01 06150

(51) Int. Cl.⁷ .............................. G01S 3/16; H04B 7/08; H04L 1/02
(52) U.S. Cl. .................... 342/378; 455/65; 375/347; 370/342
(58) Field of Search .................. 342/368–378; 455/65, 277.1, 296; 375/267, 347, 349; 370/342

(56) References Cited

U.S. PATENT DOCUMENTS

| | | | | |
|---|---|---|---|---|
| 4,255,791 A | * | 3/1981 | Martin | 342/378 |
| 4,931,977 A | * | 6/1990 | Klemes | 342/378 |
| 5,812,090 A | * | 9/1998 | Chevalier et al. | 342/378 |
| 6,018,317 A | * | 1/2000 | Dogan et al. | 342/378 |
| 6,055,231 A | * | 4/2000 | Mesecher et al. | 370/342 |
| 6,249,251 B1 | * | 6/2001 | Chang et al. | 342/378 |
| 6,320,899 B1 | * | 11/2001 | Chang et al. | 342/378 |
| 2002/0109631 A1 | * | 8/2002 | Li et al. | 342/378 |
| 2002/0135514 A1 | * | 9/2002 | Yoshida | 342/378 |
| 2002/0150068 A1 | * | 10/2002 | Orr et al. | 370/342 |
| 2002/0193146 A1 | * | 12/2002 | Wallace et al. | 375/347 |

FOREIGN PATENT DOCUMENTS

| | | | | |
|---|---|---|---|---|
| EP | 582233 A1 | * | 2/1994 | H04B/7/10 |
| WO | WO 200113466 A1 | * | 2/2001 | G01S/3/16 |

OTHER PUBLICATIONS

Smart antenna arrays for CDMA systems, J.S. Thompson et al., IEEE Personal Communications, vol. 3(5), p. 16–25, Oct. 1996.*

Space–time processing for wireless communications, A.J. Paulraj et al., IEEE Signal Processing Magazine, vol. 14(6), p. 49–83 Nov. 1997.*

* cited by examiner

Primary Examiner—Thomas H. Tarcza
Assistant Examiner—F H Mull
(74) Attorney, Agent, or Firm—Oblon, Spivak, McClelland, Maier & Neustadt, P.C.

(57) ABSTRACT

The invention concerns a method and a device for receiving a signal transmitted by a source with a plurality of antennas, in which a plurality of beam signals are obtained by weighting the signals received by the different antennas. The beam signals are correlated with the replica of a reference signal transmitted by the source and then combined by means of coefficients obtained from correlation results.

20 Claims, 10 Drawing Sheets

SIGNAL RECEPTION METHOD AND DEVICE

BACKGROUND OF THE INVENTION

1. Field of the Invention

The present invention concerns in general terms a method and device for receiving signals by means of an array of antennas. It applies particularly to the reception by a base station of signals transmitted by one or more mobile terminals.

2. Description of Related Art

Beamforming is well known in the field of narrow band antenna processing. It uses an array of antennas, generally linear and uniform (that is to say with a constant spacing between the antennas) and a signal weighting module. In order to form a beam in reception mode, the signals received by the different antennas in the array are weighted by a set of complex coefficients before being added.

If the vector of the signals received by the N antennas in the array is denoted $x=(x_0,x_1, \ldots ,x_{N-1})^T$ and the vector of the weighting coefficients (which will be referred to more simply as the weighting vector) is denoted $w=(w_0,w_1, \ldots ,w_{N-1})^T$, the output signal y of the beamformer will be written:

$$y=w^T x \quad (1)$$

When it is wished to receive the signal transmitted by a given source (for example a mobile terminal), the weighting coefficients $w_i$ are determined so that the reception beam points in the direction of this source. In the majority of cases, the direction of arrival (DOA) of the signal is not known and use is made of one of a number of estimation methods available in the state of the art (for example MUSIC, ESPRIT and derivatives thereof).

If a priori knowledge of a reference signal transmitted by the source (or an estimation of a transmitted signal) is available, it is possible to determine the weighting coefficient so as to minimise the root mean square error between the output of the beamformer and the reference signal. Equation (1) represents a spatial filtering operation and the coefficients of the optimum filter can then be obtained by means of the Wiener-Hopf equation:

$$w^T = R_{dx} R_{xx}^{-1} \quad (2)$$

where $R_{xx}$ is the autocorrelation matrix of the signals received, that is to say $R_{xx}=E(xx^H)$, and $R_{dx}$ is the matrix (in this case, here, that of a linear form) for correlation of the reference signal d with the received signals, that is to say $R_{dx}=E(dx^H)$. These matrices must be updated when the spatial transfer function varies.

If it is wished to receive the signals transmitted by a plurality of sources $S_0, \ldots S_{M-1}$ by means of the array of antennas, it suffices to form a plurality M of beams pointing in the respective directions of arrival of the signals transmitted by the different sources. If a priori knowledge of the reference signals $d_0, \ldots ,d_{M-1}$ transmitted by the different sources is available, it is possible to determine the weighting coefficients of each of the M beamformers by the matrix:

$$W^T = R_{dx} R_{xx}^{-1} \quad (3)$$

where $R_{xx}$ is the autocorrelation matrix of the signals received, that is to say $d=(d_0, \ldots ,d_{M-1})^T$ is the vector of the reference signals and $R_{dx}$ is the correlation matrix between the reference signals and the received signals, that is to say $R_{dx}=E(dx^H)$. The respective weighting vectors of the different beamformers are given by the columns of the matrix W.

Figure 1:
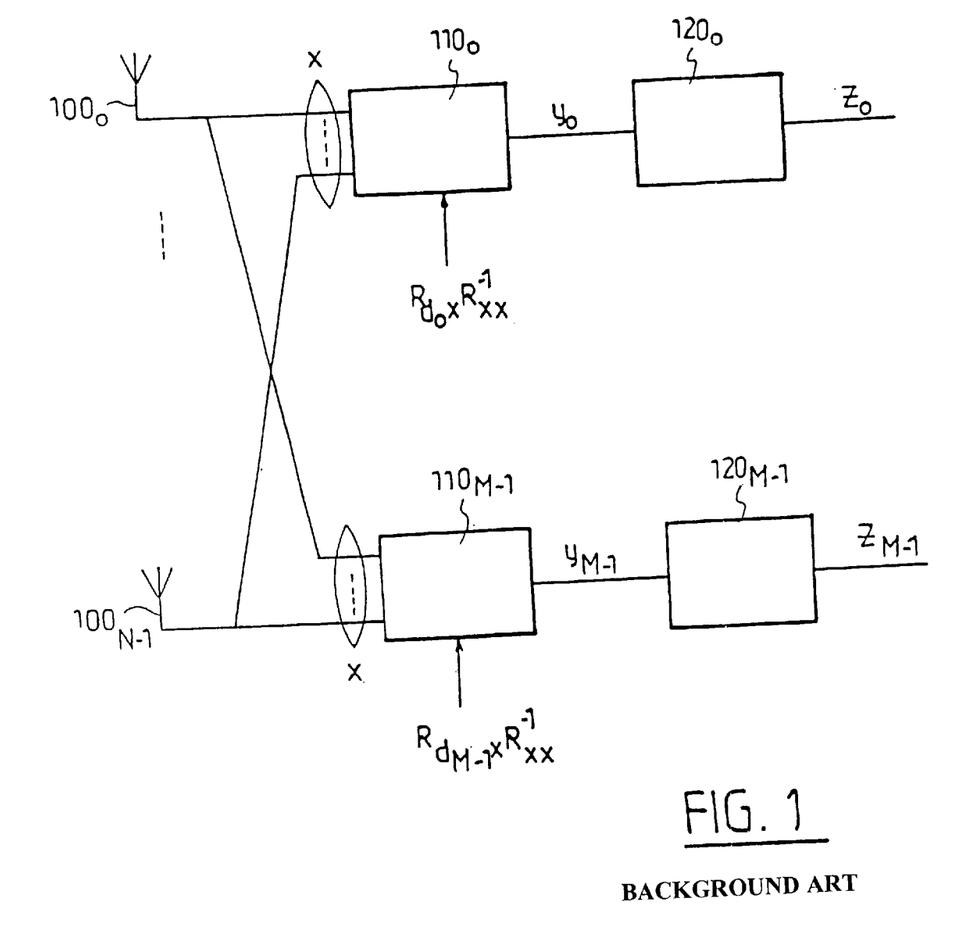
FIG. 1 depicts schematically a first type of known reception device.

This technique has in particular been applied in the field of mobile telecommnunications, notably to the CDMA (Code Division Multiple Access) systems where it is known by the acronym CAAAD (Coherent Adaptive Array Diversity). A CAAAD receiver is illustrated schematically in FIG. 1. It comprises an array of antennas $100_0, \ldots ,100_{N-1}$, beamformers $110_0, \ldots ,110_{M-1}$ receiving the N antennas signals and supplying the beam signals $y_0, \ldots ,y_{M-1}$ to rake receivers $120_0, \ldots ,120_{M-1}$. Each of the M beamformers points towards the direction of arrival of the signal transmitted by mobile terminal. At the output of each beamformer, a RAKE receiver effects an MRC (Maximum Ratio Combining) combination of the signals relating to the different propagation paths between the mobile terminal in question and the array of antennas. It is assumed that all the propagation paths are received by the beamformer.

The CAAAD reception technique is optimum according to a criterion for minimisation of the root mean square error (MMSE or Minimum Mean Square Error) but is difficult to implement. This is because it requires as many beamformers as there are mobile terminals in the cell. In addition, the inversion of the matrix $R_{xx}$ (or equivalently the resolution of a system of N linear equations with N unknowns) is a complex operation which, in practice, will have to be performed by dedicated circuits. Furthermore, since the beamforming has to be adaptive in order to follow the movement of the terminal, this operation must be performed frequently, which burdens the calculation resources of the receiver.

Figure 2:
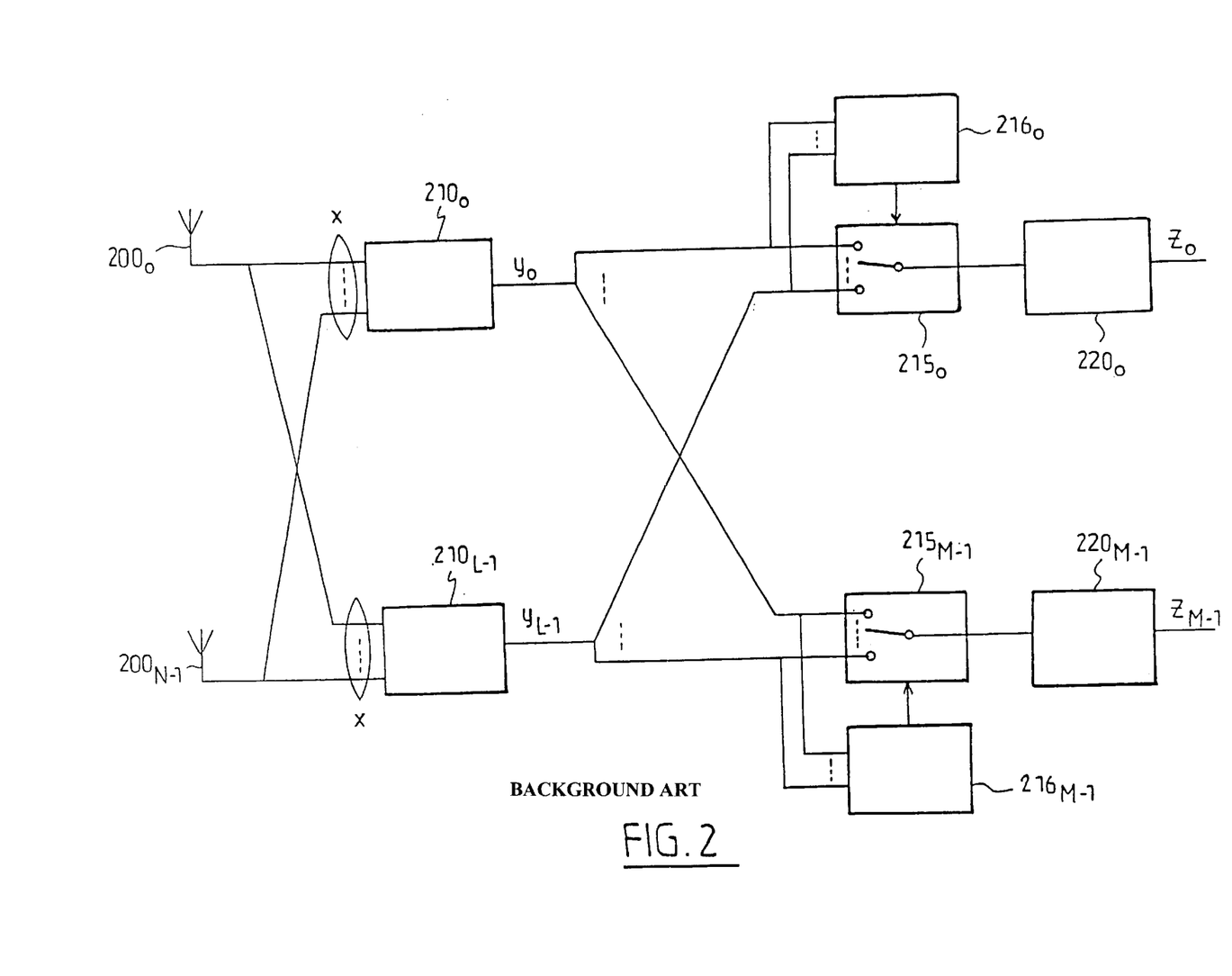
FIG. 2 depicts schematically a second type of known reception device.

One reception technique, more robust and of lower performance, consists of forming a large number of fixed beams, for example beams which are angularly equally distributed, and, for each mobile terminal, selecting the one which supplies the signal with the highest power coming from the said terminal. A receiver operating according to this principle is illustrated in FIG. 2. The beamformers $210_0, \ldots ,210_{L-1}$ with L>>N, where N is the number of mobile terminals, form L fixed beams from signals received by the antennas $200_0, \ldots ,200_{N-1}$. The beam signals $y_0, \ldots ,y_{L-1}$ output from the beamformers are transmitted to a plurality of selection modules $215_0, \ldots , 215_{M-1}$, each selection module being associated with a mobile terminal. Decision modules $216_0, \ldots ,216_{M-1}$ supply to each of the selection modules the index of the beam to be selected. A decision module $216_i$ associated with a terminal $i \in \{0, \ldots ,N-1\}$ effects a correlation between the beam signals $y_0, \ldots ,y_{L-1}$ and a reference signal transmitted by this terminal, chooses the index of the beam supplying the highest energy and transmits it to the selection module $215_i$. The reference signals of the different terminals must be chosen so as to be orthogonal: for a CDMA system, use would be made of the pilot symbols transmitted over the uplink channel DPCCH (Dedicated Physical Control CHannel). The beam signal selected by the selection modules $215_0, \ldots ,215_{M-1}$ are then supplied to RAKE receivers $222_0, \ldots ,220_{M-1}$ exploiting the reception diversity within the selected fixed beam.

This reception technique does however have many drawbacks. It requires on the one hand the formation of a large number of beams in order to obtain a good angular aiming resolution. Moreover, it functions badly in a micro or pico-cellular environment in which signal propagates along paths which are broadly angularly scattered because of multiple reflections. In this case, the fixed beam selected for a terminal will very often contain only the propagation path with the highest power and the other paths will not be used by the RAKE receiver downstream.

SUMMARY OF THE INVENTION

The aim of the invention is to propose a reception method by means of an array of antennas which does not have the aforementioned drawbacks, in particular which allows optimum reception of signals transmitted by a plurality of sources without requiring large calculation resources.

To this end, the invention is defined by a method of receiving a signal transmitted by a source by means of an array of antennas, in which a plurality of beam signals are formed by weighting of the signals received by the different antennas. According to this method each of the said beam signals is correlated with the replica of a reference signal transmitted by the said source and the said beam signals are combined by means of coefficients obtained from the correlation results.

The coefficients can be obtained by complex conjugation of the said correlation results and the beam signals can be normed prior to their combination.

Typically, the coefficients are obtained from a linear function of the previously conjugated correlation results. Advantageously, the coefficients are obtained by the matrix operation $\gamma = \Omega^{-1}\alpha^*$ where $\gamma = (\gamma_0, \ldots, \gamma_{L-1})^T$ is the vector of the said coefficients, $\alpha = (\alpha_0, \ldots, \alpha_{L-1})^T$ is the vector of the said correlation results, L is the number of beams and $\Omega$ is the matrix of size L×L whose coefficients are a function of the correlation of the gain functions relating to the different beams.

According to a first variant, the coefficients $\Omega_{l'l}$ are obtained by $\Omega_{l'l} = g_{l'}{}^H g_l$ where $g_l$ and $g_{l'}$ are vectors formed by angular sampling of the gain functions relating to the beams of indices l and l'.

According to a second variant, the coefficients $\Omega_{l'l}$ are obtained by $\Omega_{l'l} = \int G_{l'}(\theta)^* G_l(\theta) d\theta$ where $G_l(\theta)$ and $G_{l'}(\theta)$ are the gain functions relating to the channel of indices l and l' respectively and where the summing is effected over the angular scanning range defined by the array.

Advantageously, the signal resulting from the combination of the said beam signals is subjected to a putting back in phase of the components relating to the different propagation paths between the said source and the said array.

The invention is also defined by a method of receiving, by means of an array of antennas, signals transmitted by a plurality of sources, in which a plurality of beam signals are formed by weighting of the signals received by the different antennas and in which, for each source, the said beam signals are correlated with a replica of the reference signal transmitted by the said source and the said beam signals are combined by means of coefficients obtained from the correlation results.

Advantageously, prior to the combination step and for each beam signal, the components relating to the different propagation paths between the said source and the said array are put back in phase.

Typically, for each source $S_m$, the coefficients are obtained by means of the matrix operation $\gamma^m = \Omega^{-1}(\alpha^m)^*$ where $\gamma_m = (\gamma_0^m, \ldots, \gamma_{L-1}^m)^T$ is the vector of the coefficients for the source $S_m$, $\alpha_m = (\alpha_0^m, \ldots, \alpha_{L-1}^m)^T$ is the vector of the said correlation results, L is the number of beam signals and $\Omega$ is the matrix of size L×L whose coefficients are a function of the correlation of the gain functions relating to the different beams.

According to a first variant, the coefficients $\Omega_{l'l}$ are obtained by $\Omega_{l'l} = g_{l'}{}^H g_l$ where $g_l$ and $g_{l'}$ are vectors formed by angular sampling of the gain functions relating to the beams of indices l and l'.

According to a second variant, the coefficients $\Omega_{l'l}$ are obtained by $\Omega_{l'l} = \int G_{l'}(\theta)^* G_l(\theta) d\theta$ where $G_l(\theta)$ and $G_{l'}(\theta)$ are the gain functions relating to the beams of indices l and l' respectively and where the adding is effected over the angular scanning range defined by the array.

The invention is also defined by a device for receiving a signal transmitted by a source or a plurality of sources comprising means for implementing the method disclosed above.

BRIEF DESCRIPTION OF THE DRAWINGS

The characteristics of the invention mentioned above, as well as others, will emerge more clearly from a reading of the following description given in relation to the accompanying figures, amongst which.

DETAILED DESCRIPTION OF THE INVENTION

A first idea at the basis of the invention is based on the possibility of decomposing a reception gain function over a set of elementary beams.

A second idea at the basis of the invention is using this decomposition in order to dispense with the matrix inversion in equation (2) or (3).

The French patent application filed on Oct. 31, 2000 in the name of the applicant under the number FR0014222 and incorporated here by reference shows that it is possible to decompose any gain function obtained by beamforming (on transmission and on reception) over a set of elementary functions. The main results disclosed therein will be set out briefly below.

Let h be the linear application of $C^N$ in the vector space F of the complex functions defined over the angular range in which the network operates (for example $[-\pi/2, \pi/2]$ for a linear array) which associates, with any vector v of $C^N$, the complex gain function in reception $G = h(v)$ obtained by weighting the antennas signal by the coefficients $v_i$, $i = 0, \ldots, N-1$, that is to say, for example, for a linear array:

$$G(\theta) = \sum_{i=0}^{N-1} v_i \exp(-j\varphi_i(\theta)) \quad (4)$$

where $\phi_i(\theta)=(2\pi d/\lambda)i.\sin\theta$ is the phase difference between two consecutive antennas, and d and $\lambda$ are respectively the pitch of the array and the wavelength in question. The image of $C^N$ by h denoted Im(h) is a vectorial subspace of F with a dimension at most equal to N. Let there now be a gain function $G'(\theta)$ which it is wished to generate by means of the array of antennas. The function $G'(\theta)$ can be projected onto Im(h): let $G'_P(\theta)$ be this projection. There exists a vector v such that $h(v)=G'_P$ and it is possible to show that this vector makes it possible to best approximate the gain function $G'(\theta)$.

In addition, the complex gain function $G(\theta)$ obtained (whose modulus gives the diagram of the antenna equivalent to the array) has a limited band. It is therefore possible to angularly sample at a frequency greater than the Nyquist frequency without loss of information. It is possible to show for example that the Nyquist frequency is N rad$^{-1}$ for a linear array and 2N rad$^{-1}$ for a circular array, which leads to taking K>$\pi$N (in practice K=4N) samples over the angular range [$-\pi/2,\pi/2$] in the first case and the same number of samples over the angular range [$-\pi,\pi$] in the second case.

If the samples of the complex diagram are denoted $(g_k)$, k=0, . . . ,K–1, that is to say $g_k=G(\theta_k)$ where the $\theta_k$ values are M angles equally distributed over [$-\pi/2,\pi/2$] (linear array) or [$-\pi,\pi$] (circular array) defining the sampling directions, it is possible to define a linear application $h_s$ of $C^N$ in $C^K$ which makes the gain vector $h(v)=g=(g_0,g_1, \ldots ,g_{K-1})^T$ correspond to any weighting vector v. The image of $C^N$ by $h_s$ is a vectorial subspace of $C^K$ with a dimension at most equal to N which will be denoted Im($h_s$). If a base of $C^N$ is chosen, for example the canonical base and a base of $C^K$, it is possible to express the linear application h by a matrix H of size K×N which is at most of rank N.

Let now g' be a gain vector corresponding to any sampled complex gain function $G'(\theta)$ which it is wished to obtain. It is possible to find a vector v such that $h_s(v)$ is as close as possible to g' in the sense of the Euclidian metric on $C^K$, that is to say such that $h_s(v)=g'_P$ where $g'_P$ is the orthogonal projection of the vector g' onto Im($h_s$). If the matrix H is of rank N, the sought-for vector v is written:

$$v=H^+g' \quad (5)$$

where $H^+$ is the pseudo-inverse matrix of H defined by $H^+=(H^H H)^{-1}H^H$ where $H^H$ is the conjugate transpose of the matrix H. The weighting vector v will make it possible to obtain, by means of the beamforming, a gain function $G(\theta)$ best approximating the desired gain function $G'(\theta)$.

In theory, N independent vectors of the space Im($h_s$) are enough to generate it. It will however be possible to be contented, for reasons which will be seen subsequently, with generating a subspace $F_L$ of Im($h_s$) by means of a set of independent vectors of cardinal L$\leq$N. It will be noted that $F_N$=Im($h_s$). The generating vectors of $F_L$ will be denoted $g_0, \ldots ,g_{L-1}$. In practice, it will be possible to choose L=N vectors corresponding to beams pointing in the sampling directions $\theta_k$. The beams corresponding to the generating vectors of $F_L$ will be denoted $B_0, B_1, \ldots B_{L-1}$ and they will simply be referred to as "generating beams". The weighting vectors making it possible to form the generating beams will be denoted $v_0, \ldots ,v_{L-1}$, or in other words $h(v_l)=g_l$.

Figure 3:
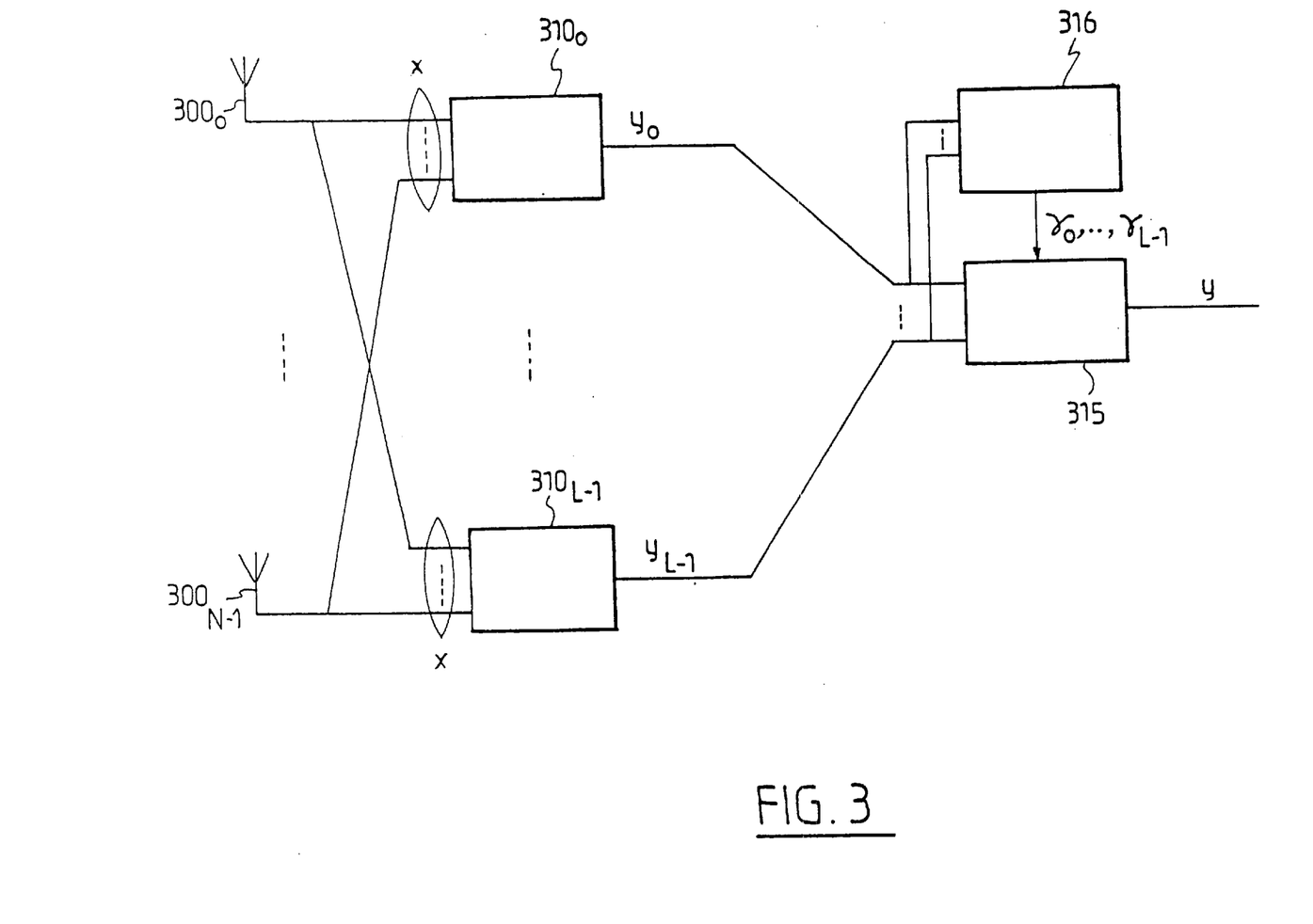
FIG. 3 depicts schematically a reception device according to the invention.

FIG. 3 illustrates a reception device according to the invention. Beamformers $310_0, \ldots ,310_{L-1}$ can be seen therein, responsible for forming the aforementioned L generating beams. If the angular range has a blind angle in which no signal source can be situated, no generating beam will be chosen in this area. The beam signals $\phi_0, \ldots , \phi_{L-1}$ are directed towards a combination module 315 which calculates the output signal y by:

$$y = \sum_{l=0}^{L-1} \gamma_l \varphi_l \quad (6)$$

where the coefficients $\gamma_l$, l=1, . . . ,L are supplied by the optimisation module 316.

Figure 4:
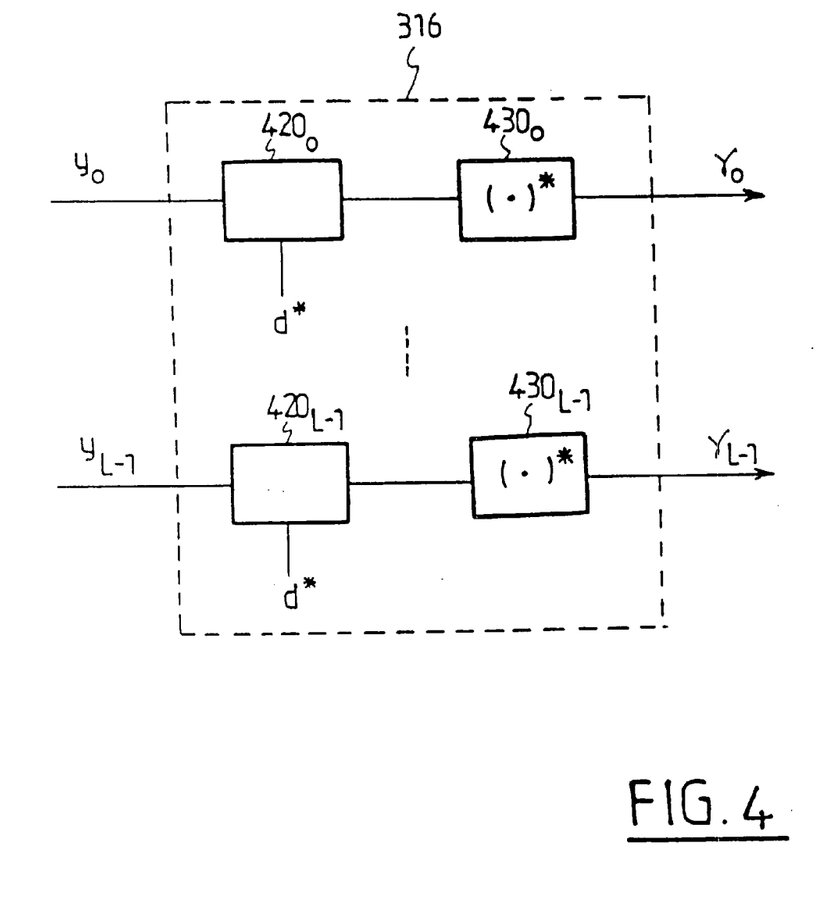
FIG. 4 depicts schematically a module of the invention, according to a first variant embodiment.

FIG. 4 illustrates the optimisation module 316 according to a first variant. This effects the correlation between the beam signals $\phi_0, \ldots , \phi_{L-1}$ and a replica of a reference signal d transmitted by the source S, that is to say:

$$\alpha_l = E(y_l d^*) \quad (7)$$

The coefficients $\alpha_l$ are conjugated at $430_0, \ldots ,430_{L-1}$ in order to supply the combination coefficients $\gamma_l$. The latter are used by the combination module 315 in order to effect a coherent combination of the beam signals $\phi_0, \ldots , \phi_{L-1}$ of the MRC type. If the L generating beams are separated (or in other words if the L gain vectors associated with these beams are chosen so as to be orthogonal), the reception method supplying y is optimum. On the other hand, if the L generating beams are imperfectly separated, the signals of the different beams are correlated and the MRC combination is no longer optimum. This is because the interfering signals received by the imperfectly separated beams are also combined coherently.

If the interference level is not the same for each of the beams, the beam signals are normed prior to their combination. The output signal is then obtained by:

$$y = \sum_{l=0}^{L-1} \gamma_l \frac{\varphi_l}{|\varphi_l|} \quad (8)$$

Figure 5:
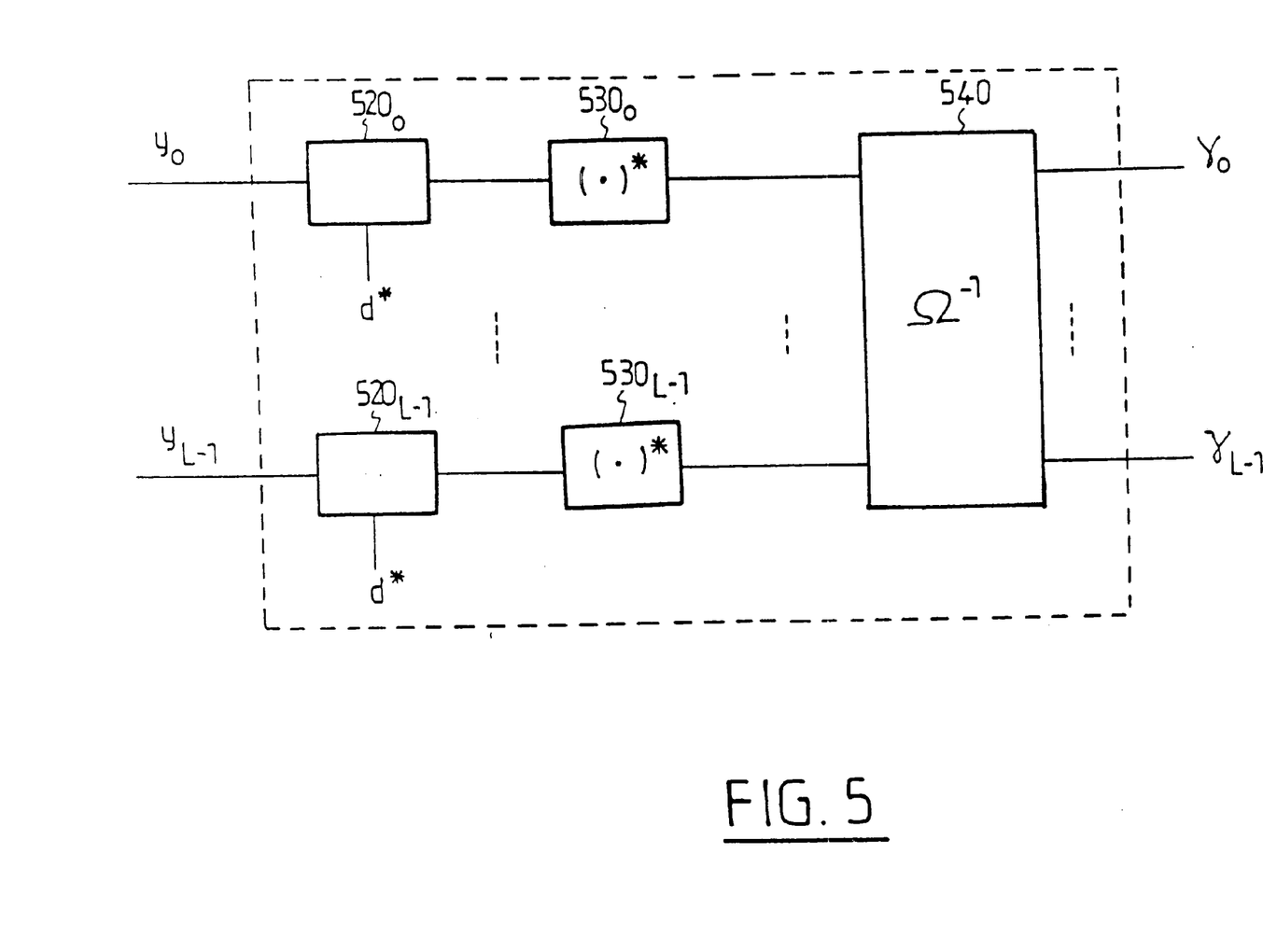
FIG. 5 depicts schematically a module of the invention, according to a second variant embodiment.

FIG. 5 illustrates the optimisation module 316 according to a second variant embodiment. According to this variant, it is sought to best approximate an optimum formation of beam by a combination of generating beams.

The vector x can be expressed as a function of the signal from the source and a spatial transfer function:

$$x=as+b \quad (9)$$

where a is a vector of dimension N expressing the spatial transfer function between the source and the array of antennas and b is the noise vector whose components are assumed to be Gaussian.

The signal s transmitted by the source S arrives at the array with an angular distribution $F(\theta)$. The vector of dimension K whose components are $F(\theta_k)$ where the angles $\theta_k$ define the sampling directions will be referred to as f. This therefore gives, by linearity of the function h:

$$f=h(as+b)=s.h(a)+n \quad (10)$$

where n=h(b). The beam function $\phi$ corresponding to a complex gain function $G(\theta)$ and to an associated gain vector g can be written:

$$\phi=g^T f \quad (11)$$

The optimum vector $g_{opt}$ consequently satisfies:

$$g_{opt} = (h(a))^* \tag{12}$$

and hence $$s^* g_{opt} + n^* = f^* \tag{13}$$

It will be assumed initially that L=N. There is then a set of generating vectors of Im(h), that is to say $g_0, \ldots, g_{N-1}$, on which the vector $g_{opt}$ can be decomposed:

$$g_{opt} = \sum_{l=0}^{N-1} \gamma_l g_l \tag{14}$$

In addition, the result of the correlation of the beam signal $\phi_{l'}$ with the transmitted signal can be written:

$$\alpha_{l'} = E(\phi_{l'} s^*) = E(f^T g_{l'} s^*) \tag{15}$$

and hence, taking account of (13) and (14):

$$\alpha_l = E\left(\sum_{l=0}^{N-1} \gamma_l^* g_l^H g_{l'} s s^*\right) + E(n^T g_l s)$$

$$= E(ss^*) \cdot \sum_{l=0}^{N-1} \gamma_l^* g_l^H g_{l'} \tag{16}$$

$$= P_s \sum_{l=0}^{N-1} \gamma_l^* g_l^H g_{l'}$$

If a normed power reference signal is used, it is possible to express (16) vectorially:

$$\gamma = \Omega^{-1} \alpha^* \tag{17}$$

with $\gamma = (\gamma_0, \ldots, \gamma_{N-1})^T$, $\alpha = (\alpha_0, \ldots, \alpha_{N-1})^T$ and $$\Omega_{ll'} = g_l^H g_{l'} \tag{18}$$

It is reminded that the vectors $g_l$ are the vectors consisting of the samples of the gain functions $G_l(\theta)$. Formula (18) translates the correlation between the gain functions of the base beams. If functions $G_l(\theta)$ are available, this can then be written:

$$\Omega_{ll'} = \int G_{l'}(\theta)^* G_l(\theta) d\theta \tag{19}$$

where the adding is carried out over the angular range of the array.

It should be noted finally that, if the beams are decorrelated, the matrix $\Omega$ is a multiple of the identity matrix and the first embodiment is found again.

If it assumed that L<N, it is not possible in the general case to find a decomposition such as (14). In such instance, the vector $g_{opt}$ is projected first onto the space $F_L$ generated by the vectors $g_l$. Equations (17) to (19) remain valid, the matrix $\Omega$ then being of dimension L×L and of rank L.

According to the second variant embodiment of the module 316 illustrated in FIG. 5, the beam signals $\phi_0, \ldots, \phi_{L-1}$ are decorrelated in the modules $520_0, \ldots, 520_{L-1}$ with the reference signal d. The correlation results $\alpha_0, \ldots, \alpha_{L-1}$ are then conjugated by means of the conjugation modules $530_0, \ldots, 530_{L-1}$ before being supplied to the matrix calculation module 540 calculating $\gamma_0, \ldots, \gamma_{L-1}$ according to (17).

It should be noted that the decorrelation matrix of the beams $\Omega^{-1}$ (contrary to the decorrelation matrix of the antenna signals $$R_{xx}^{-1}$$

) depends only on the generating beams and therefore can be calculated once and for all. In particular, it does not depend on the movement of the source S.

Figure 6:
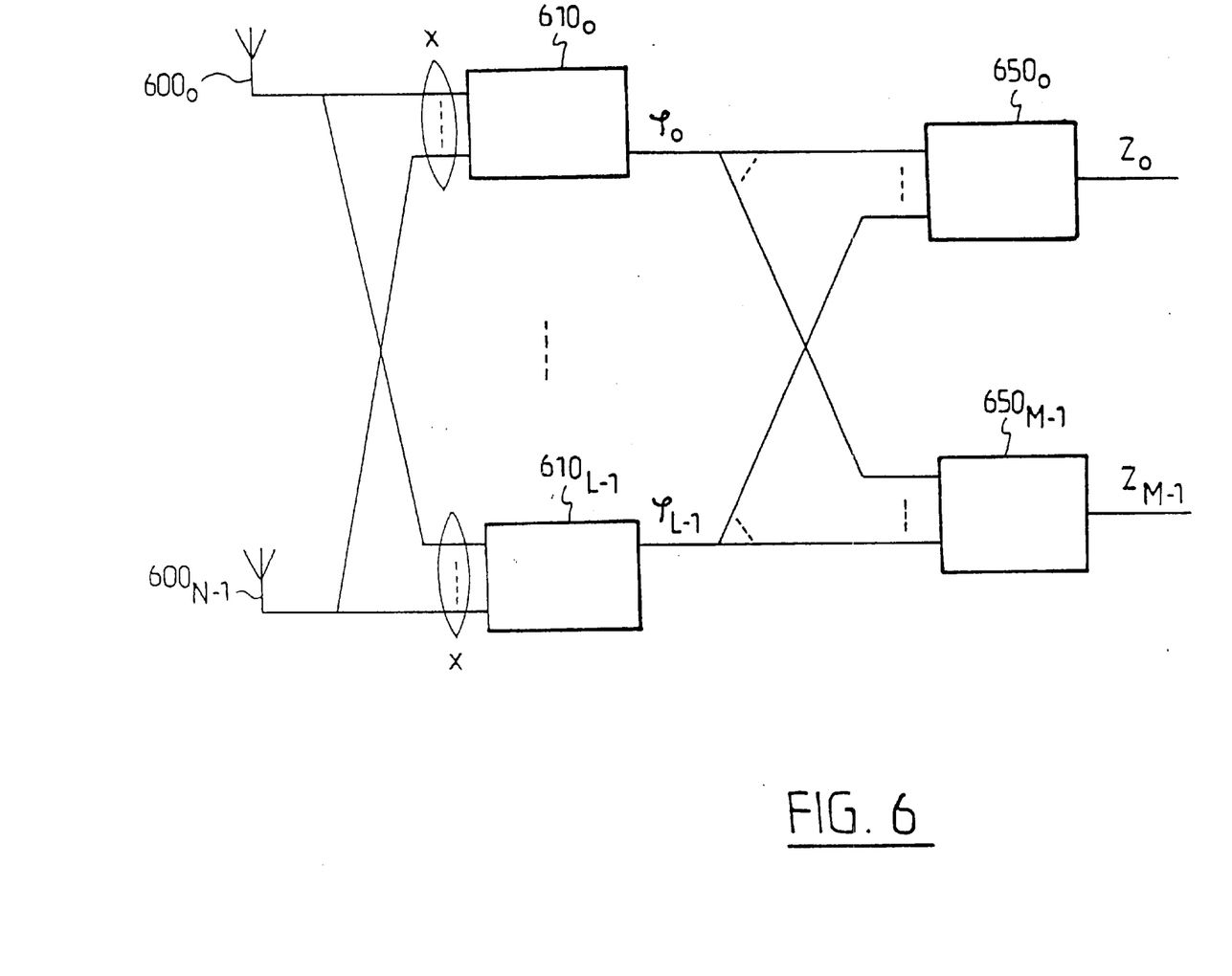
FIG. 6 depicts an example of an application of the invention to a DS-CDMA system.

FIG. 6 illustrates a first example of an application of the invention to a DS-CDMA reception system. This system is, for example, situated at a base station in order to receive the signals transmitted by a plurality M of mobile terminals, each signal having been spread by a user code $C_m$. The system comprises an array of antennas $600_0, \ldots, 600_{N-1}$. The beamformers $610_0, \ldots, 610_{L-1}$ form the L generating beams and produce the corresponding L beam signals $\phi_0, \ldots, \phi_{L-1}$. These signals are supplied to M combination modules $650_0, \ldots, 650_{M-1}$ which give the received signals $z_0, \ldots, z_{M-1}$ coming from the M terminals.

Figure 7:
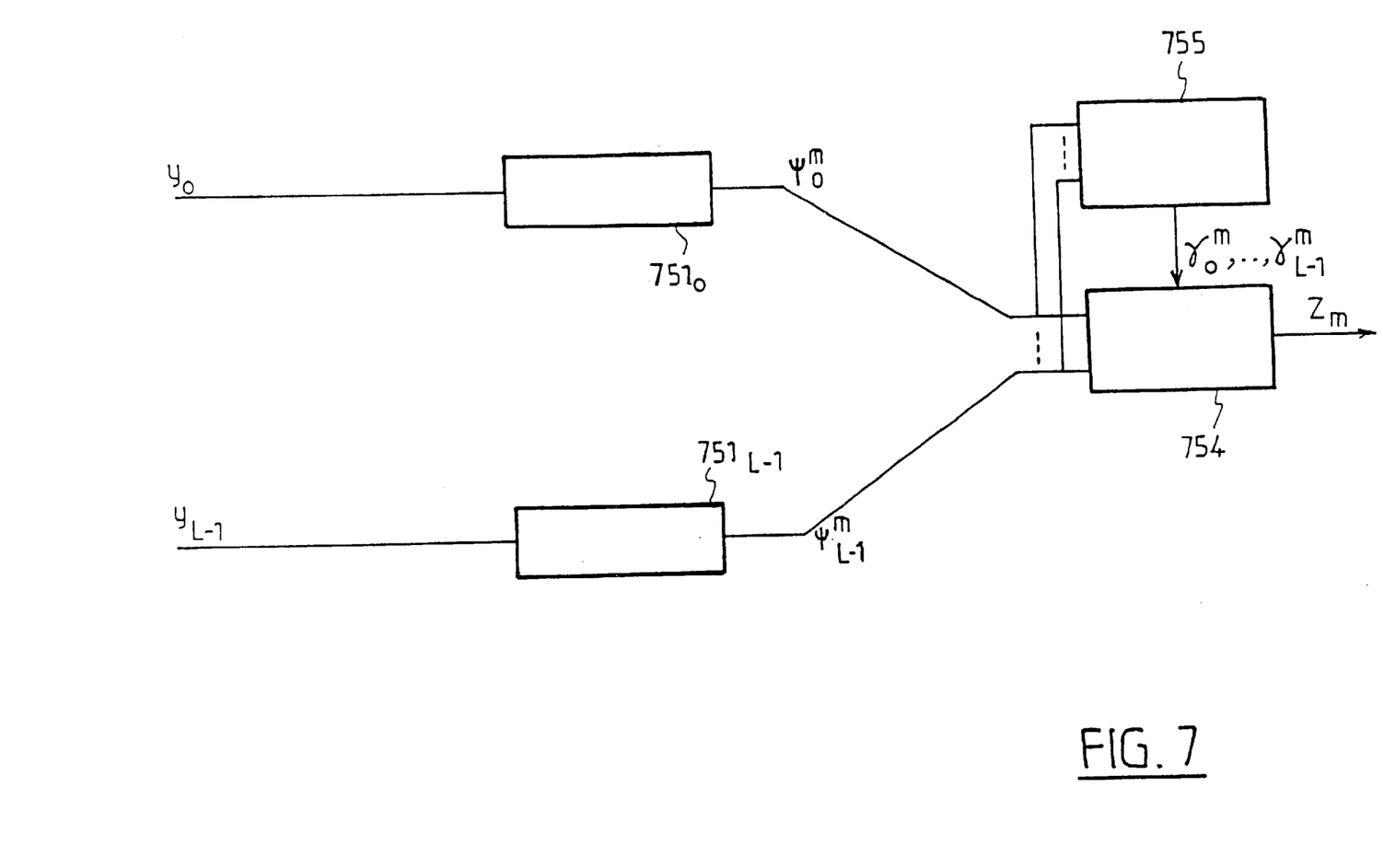
FIG. 7 depicts a module of the system FIG. 6 according to a first example embodiment.

FIG. 7 illustrates the structure of a combination module $650_m$ according to a first example embodiment. In the designation of the different modules, the index m has been omitted in order not to overload the notations. The different beam signals $\phi_0, \ldots, \phi_{L-1}$ are transmitted to L RAKE receivers $751_0, \ldots, 751_{L-1}$, which correlate the beam signals with the user code $C_m$ affected by the delays of the different paths and effects the coherent combination of the signals issuing from the different paths. The signals $$\psi_0^m, \ldots, \psi_{L-1}^m$$

represent the combinations of paths within the different generating beams. The module 754 provides the combination of the different beams, or more precisely of the signals $$\psi_0^m, \ldots, \psi_{L-1}^m,$$

by means of the complex coefficients $$\gamma_l^m$$

given by the optimisation module 755. The signal $z_m$ at the output of the module 755 supplies an optimum estimation of the symbol transmitted by the mobile terminal $S_m$.

Figure 8:
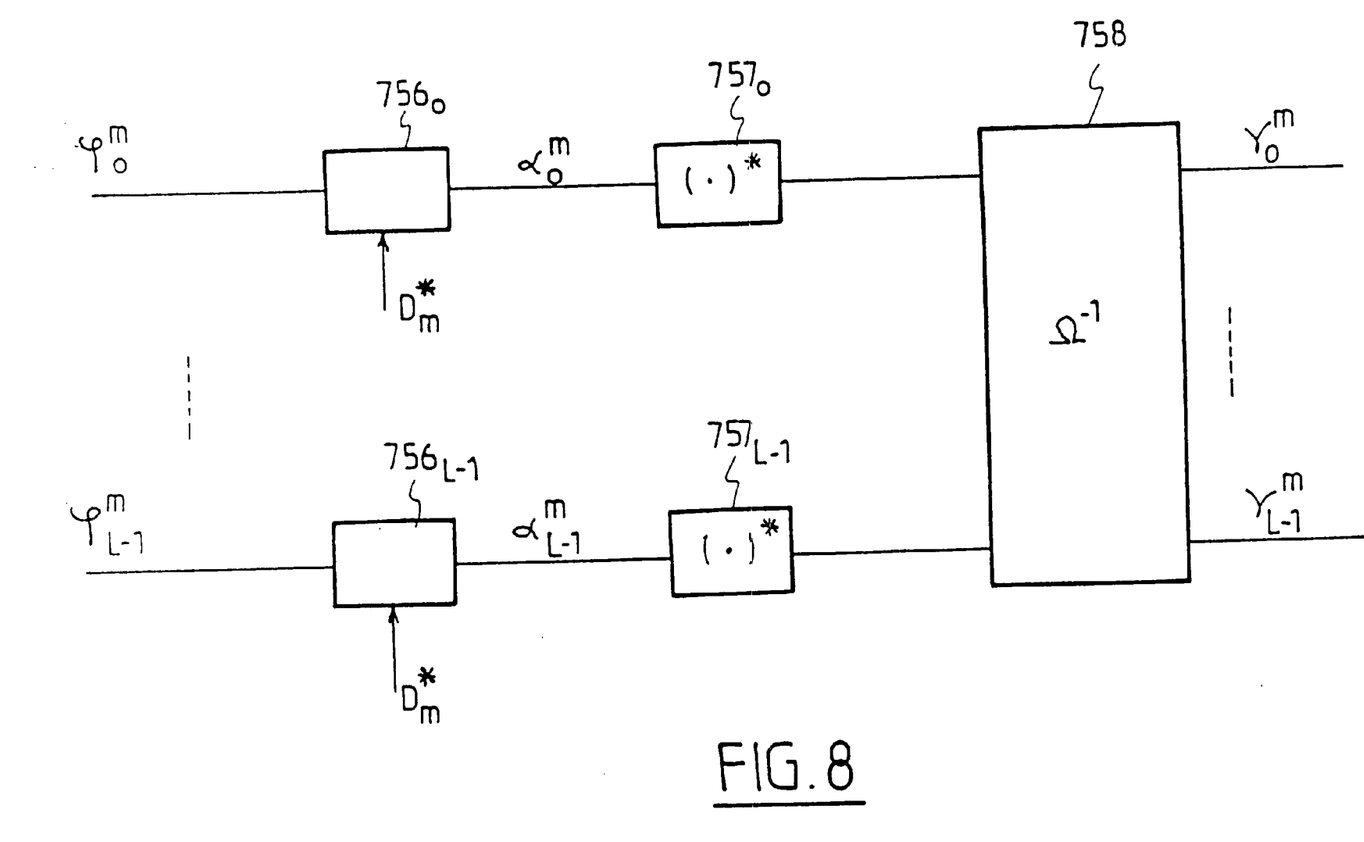
FIG. 8 depicts a sub-module of the module of FIG. 7.

FIG. 8 illustrates the structure of the optimisation module 755. The signals $$\psi_0^m, \ldots, \psi_{L-1}^m$$

are first of all correlated with the despread pilot signal $D_m$ and the correlation results are then conjugated in the conjugation modules $757_0, \ldots, 757_{L-1}$. The conjugated values thus obtained are transmitted to a matrix calculation module effecting the calculation:

$$\gamma^m = \Omega^{-1}(\alpha^m)^* \tag{20}$$

where $$\gamma_m = (\gamma_0^m, \ldots, \gamma_{L-1}^m)^T, \alpha_m = (\alpha_0^m, \ldots, \alpha_{L-1}^m)^T$$

and where the coefficients $\Omega_{l'l}$ are given by (18) or (19).

The reception device illustrated by FIGS. 6 to 8 makes it possible to best approximate an optimum reception by means of a set of generating beams. Each beam can cover one or more propagation paths issuing from a mobile terminal.

Figure 9:
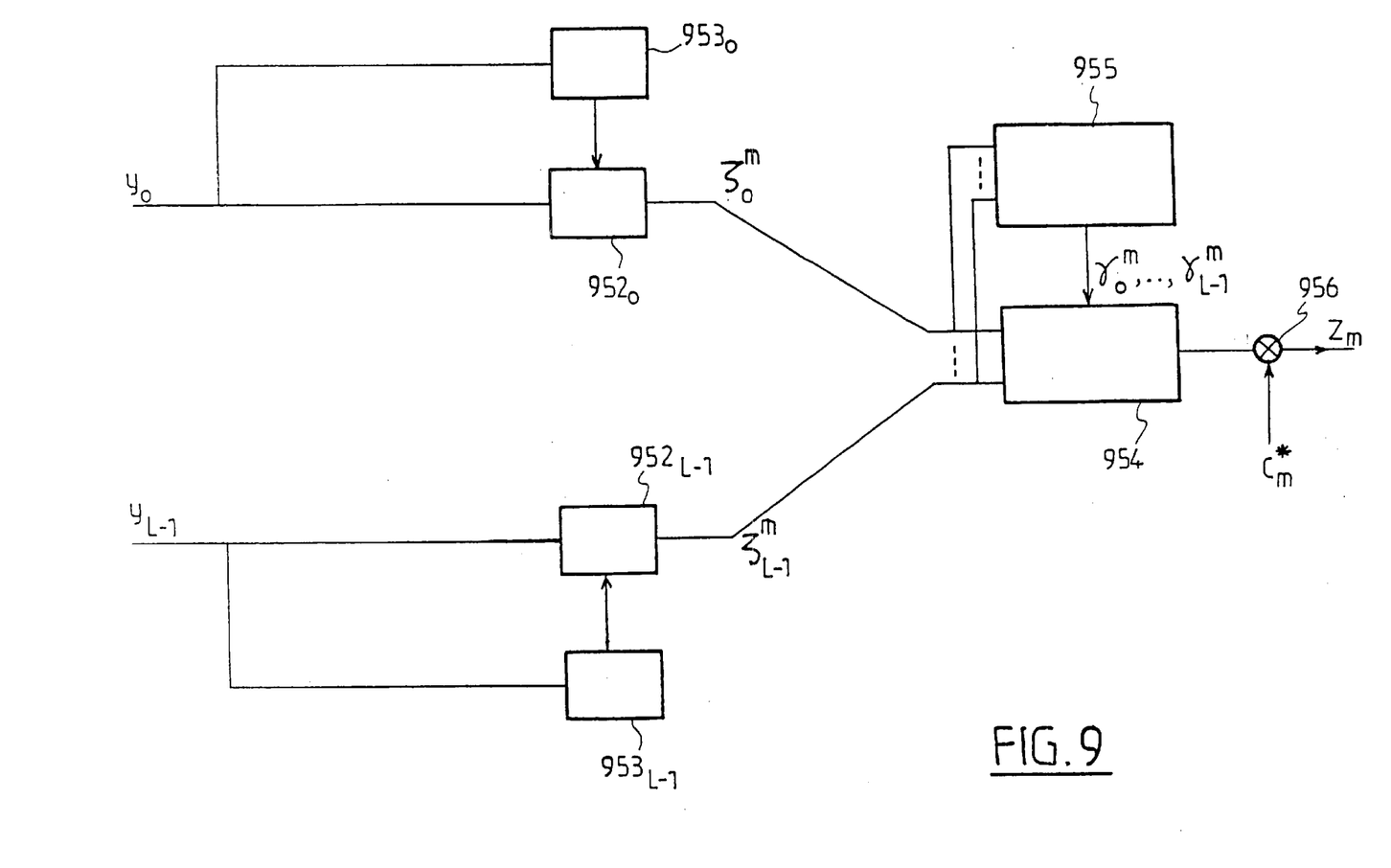
FIG. 9 depicts a module of the system of FIG. 6 according to a second example embodiment.

FIG. 9 illustrates the structure of a combination module $650_m$ according to a second example embodiment. There too, in the designation of the different modules, the index m has been omitted in order not to overload the notations. The different beam signals $\phi_0, \ldots, \phi_{L-1}$ are analysed by the delay analysers $953_0, \ldots, 953_{L-1}$ by means of a correlation with the user code $C_m$. Each beam signal $\phi_l$ is delayed at $952_l$ by the delays supplied by the analyser $953_l$ and the delayed signals are added in order to supply a signal $\zeta_l$. It should be noted that the signals $\zeta_l$ are aligned timewise for the different paths of the user m but are not despread. The signals $\zeta_l$, l=0, . . . ,L-1 are then combined at 954 by means of the complex coefficients $\gamma_l^m$ given by the optimisation module 955. The output signal of the module 955 is despread at 956 by means of the user code $C_m$ in order to supply an optimum estimation $z_m$ of the symbol transmitted by the mobile terminal $S_m$.

It should be noted that, if the paths of a user are not too dispersed in time within a beam, a more robust version without alignment in time, that is to say without the modules $952_l$ and $953_l$, can be envisaged.

Figure 10:
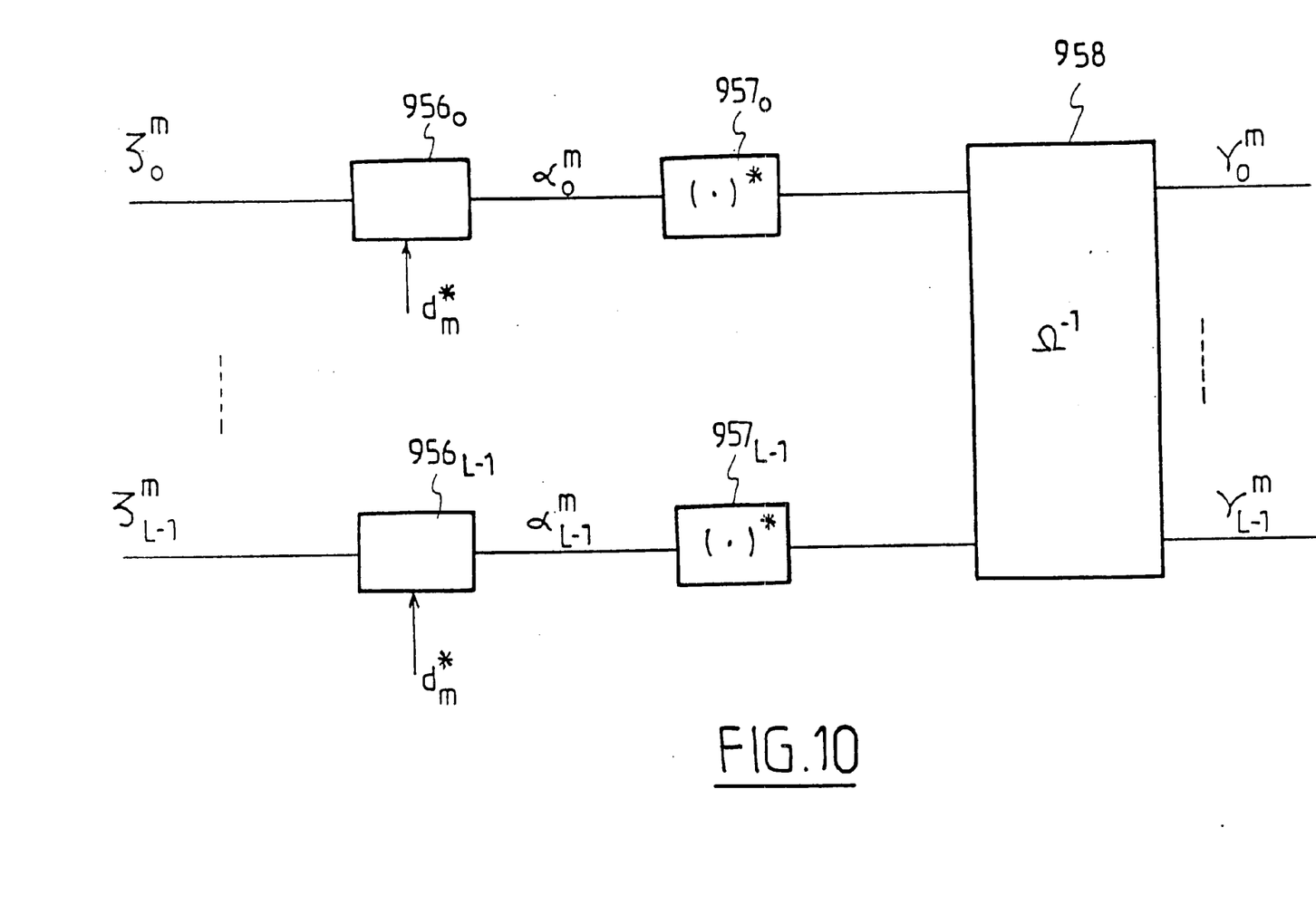
FIG. 10 depicts a sub-module of the module of FIG. 9.

FIG. 10 illustrates the structure of the optimisation module 955. Unlike the module 755, the module 955 operates before spectral despreading. The signals $\zeta_l$, l=0, . . . ,L-1 are correlated at $956_0, \ldots, 956_{L-1}$ with the pilot signal $d_m$ and the correlation results are then conjugated in the conjugation modules $957_0, \ldots, 957_{L-1}$. The conjugate values thus obtained are transmitted to a matrix calculation module 958 identical to the module 758.

It is important to note that the invention can be applied to any type of antenna array and notably to a circular array.

In addition, the reception device according to the invention has been described by means of functional modules. It goes without saying, however, that these modules can implemented both by dedicated circuits and by a processor executing all or only some of the corresponding different functions.

What is claimed is:

1. A method of receiving a signal transmitted by a source with an array of antennas, in which a plurality of beam signals are obtained by weighting the signals received by the different antennas, comprising:

correlating each of the beam signals with a replica of a reference signal transmitted by the source to generate correlation results;

combining the beam signals using coefficients obtained by the correlation results; and obtaining the coefficients based on the matrix operation $$\gamma = \Omega^{-1} \alpha^*$$

where $\gamma = (\gamma_0, \ldots, \gamma_{L-1})^T$ is the vector of the coefficients, $\alpha = (\alpha_0, \ldots, \alpha_{L-1})^T$ is the vector of the correlation results, L is the number of beams, and $\Omega$ is a matrix of size L×L whose coefficients are a function of the correlation of gain functions relating to the different beams.

2. A method according to claim 1, further comprising generating the coefficients from the complex conjugation of the correlation results.

3. A method according to claim 2, further comprising normalizing the beam signals prior to their combination.

4. A method according to claim 3, further comprising, prior to the combination of the beam signals, putting each beam signal back in phase of the components relating to the different propagation paths between the source and the array.

5. A method according to claim 2, further comprising, prior to the combination of the beam signals, putting each beam signal back in phase of the components relating to the different propagation paths between the source and the array.

6. A method according to claim 1, further comprising normalizing the beam signals prior to their combination.

7. A method according to claim 6, further comprising, prior to the combination of the beam signals, putting each beam signal back in phase of the components relating to the different propagation paths between the source and the array.

8. A method according to claim 1, further comprising:

conjugating the correlation results; and generating the coefficients from a linear function of the conjugated correlation results.

9. A method according to claim 8, further comprising, prior to the combination of the beam signals, putting each beam signal back in phase of the components relating to the different propagation paths between the source and the array.

10. A method according to claim 1, wherein the coefficients $\Omega_{l'l}$ are obtained by $$\Omega_{l'l} = g_{l'}^H g_l$$

where $g_l$ and $g_{l'}$ are vectors formed by angular sampling of the gain functions relating to the beams of indices l and l'.

11. A method according to claim 10, further comprising, prior to the combination of the beam signals, putting each beam signal back in phase of the components relating to the different propagation paths between the source and the array.

12. A method according to claim 1, wherein the coefficients $\Omega_{l'l}$ are obtained by $\Omega_{l'l} = \int G_{l'}(\theta)^* G_l(\theta) d\theta$ where $G_l(\theta)$ and $G_{l'}(\theta)$ are the gain functions relating to the beams of indices l and l' respectively and where the summing is effected over the angular scanning range defined by the array.

13. A method according to claim 12, further comprising, prior to the combination of the beam signals, putting each beam signal back in phase of the components relating to the different propagation paths between the source and the array.

14. A method according to claim 1, further comprising, prior to the combination of the beam signals, putting each beam signal back in phase of the components relating to the different propagation paths between the source and the array.

15. An apparatus for receiving a signal transmitted by a source, comprising means for implementing the method according to one of claims 1–14.

16. A method of receiving, with an array of antennas, signals transmitted by a plurality of sources, in which a plurality of beam signals are obtained by weighting the signals received by the different antennas, comprising:

for each source, correlating the said beam signals with a replica of a reference signal transmitted by the source to generate correlation results;

combining the beam signals using coefficients obtained from the correlation results; and for each source $S_m$, obtaining the coefficients based on the matrix operation $$\gamma^m = \Omega^{-1} (\alpha^m)^*$$

where $$\gamma_m = (\gamma_0^m, \ldots, \gamma_{L-1}^m)^T$$

is the vector of the coefficients for the source $S_m$, $\alpha_m = (\alpha_0^m, \ldots, \alpha_{L-1}^m)^T$ is the vector of the correlation results, L is the number of beams, and $\Omega$ is a matrix of size L×L whose coefficients are a function of the correlation of gain functions relating to the different beams.

17. A method according to claim 16, further comprising, for each source, prior to the combination step and for each beam signal, putting the components relating to different propagation paths between the source and the array back in phase.

18. A method according to claim 16, wherein the coefficients $\Omega_{l'l}$ are obtained by $$\Omega_{l'l} = g_{l'}^H g_l$$

where $g_l$ and $g_{l'}$ are vectors formed by angular sampling of the gain functions relating to beams of indices l and l'.

19. A method according to claim 16, wherein the coefficients $\Omega_{l'l}$ are obtained by $\Omega_{l'l} = \int G_{l'}(\theta)^* G_l(\theta) d\theta$ where $G_l(\theta)$ and $G_{l'}(\theta)$ are the gain functions relating to beams of indices l and l' respectively and where the summing is effected over an angular scanning range defined by the array.

20. An apparatus for receiving signals transmitted by a plurality of sources, comprising means for implementing the method according to one of claims 15–18.

* * * * *